United States Patent Office 3,658,822
Patented Apr. 25, 1972

3,658,822
DERIVATIVES OF (BENZIMIDAZOLYL-2-METHYL) PIPERAZINE AND THEIR PROCESS OF PREPARATION
Claude P. Fauran, 5 rue Lebouteaux, Paris 17eme, France; Guy M. Raynaud, 39 rue Saint-Georges, Paris 9eme, France; Jeannine A. Eberle, 106 Crue Leon Barbier, Chatou, France; and Janine M. Thomas, 132 rue Perronnet, Neuilly-sur-Seine, France
No Drawing. Filed June 25, 1969, Ser. No. 836,584
Claims priority, application Great Britain, July 6, 1968, 32,384/68
Int. Cl. C07d 51/70
U.S. Cl. 260—268 BC
1 Claim

ABSTRACT OF THE DISCLOSURE

Compounds of the formula

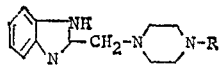

in which R is an aliphatic radical having 1 to 10 carbon atoms, which may be substituted by one or more of hydroxyl, alkoxycarboxyl, aryl, carboxyl and carbamoyl in which the nitrogen may be substituted or form part of a heterocyclic ring.

The compounds are prepared by reacting 2-chloromethyl benzimidazole with a monosubstituted piperazine in an acetonic medium in the presence of an alkali or alkaline earth metal carbonate. The compounds exhibit cardiotropic activity, analgesic activity, sedative activity and spasmolytic activity.

---

The present invention relates to novel derivatives of (benzimidazolyl-2-methyl) piperazine, their process of preparation and to their therapeutic application.

The compounds according to the present invention correspond to the general Formula I:

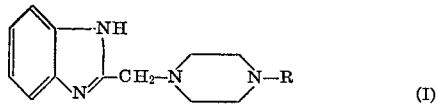

in which R represents an aliphatic radical having 1 to 10 carbon atoms, which radical may be substituted by one or more of the groups selected from hydroxyl, alkoxycarbonyl, aryl, carboxyl and carbamoyl in which the nitrogen atom may be substituted or form part of a heterocyclic ring.

The compounds of the present invention are prepared by reacting 2-chloromethyl benzimidazole of the Formula II:

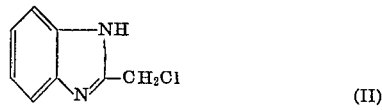

with a monosubstituted piperazine of the general Formula III:

in which R has the same signification as in Formula I.

The reaction is carried out in an acetonic medium in the presence of an alkali or alkaline earth metal carbonate and the mixture is heated under reflux. The alkali or alkaline earth metal chloride formed, which is insoluble in acetone, is separated by filtration and thereafter the acetone is evaporated. The base of the desired compound is thus obtained in crude form and may be purified by crystallization in ethyl acetate. By reacting the base with maleic acid in an acetonic or ethylic medium, the mono- or di-maleate is obtained in crystalline form. The maleic acid salt precipitates out; it is separated by filtration, washed, dried and then recrystallized in a solvent such as 95° or 100° ethanol.

The following non-limitative examples illustrate the preparation of certain compounds of the present invention.

EXAMPLE 1

N-ethoxycarbonylmethyl-N'-(benzimidazolyl-2-methyl) piperazine dimaleate 0.3 mol (31.8 g.) of sodium carbonate, 0.3 mol (50.1 g.) of 2-chloro-methyl benzimidazole and 0.3 mol (52.5 g.) of N-ethoxycarbonylmethyl piperazine in 1200 ml. of acetone are heated under reflux for 7 hours. After completion of the reaction the mineral salts are filtered off whilst still warm and the acetone is evaporated.

The residue is taken up in 200 ml. of ethyl acetate and the solution so obtained is extracted with a dilute solution of hydrochloric acid. The aqueous phase is rendered alkaline by the addition of ammonia and is extracted with ethyl acetate. On evaporation of the ethyl acetate a syrupy residue is obtained which is redissolved in 90 ml. of ethyl acetate and filtered. After cooling, a precipitate is obtained which is dried. Yield=63%; melting point=137° C.

Analysis.—Calculated (percent): C, 63.55; H, 7.33; N, 18.53. Found (percent): C, 63.39; H, 7.63; N, 18.41.

0.1 mol of the base obtained above is dissolved in 300 ml. of acetone, and 0.2 mol of maleic acid in 200 ml. of acetone is added thereto, and the mixture is then cooled. A precipitate is formed which is separated by filtration and washed with acetone. After recrystallization in 180 ml. of ethanol, N - ethoxycarbonylmethyl - N' - (benzimidazolyl - 2 - methyl) piperazine dimaleate is obtained. Yield=81%; melting point=115–116° C.

Analysis.—Calculated (percent): C, 53.93; H, 5.66; N, 10.48. Found (percent): C, 54.04; H, 5.65; N, 10.64.

EXAMPLE 2

N-cinnamyl-N'-(benzimidazolyl-2-methyl) piperazine dimaleate 0.2 mol of 2-chloromethylbenzimidazole, 0.2 mol of N-cinnamylpiperazine and 0.2 mol of sodium carbonate in 500 ml. of acetone are heated under reflux for 7 hours. After completion of the reaction the precipitate is filtered and washed several times with ethyl acetate. On cooling the acetonic mother liquor and the total extract (ethyl acetate), 47.5 g. of the base are obtained.

The dimaleate is obtained by treating 0.1 mol of the base obtained above in 200 ml. of ethanol with 0.2 mol of maleic acid in 150 ml. of ethanol. On completion of the reaction, the dimaleate is precipitated. The precipitate is separated by filtration, washed with a little acetone and recrystallized in 350 ml. of 95° ethanol. The precipitate is then dried for 3 hours under vacuum. Yield=60%; melting point=170–172° C.

Analysis.—Calculated (percent): C, 61.69; H, 5.71; N, 9.92. Found (percent): C, 61.49; H, 6.03; N, 10.02.

EXAMPLE 3

N-(2-phenyl-2-ol-propyl)-N'-(benzimidazolyl-2-methyl) piperazine dimaleate 0.15 mol of 2-chloromethyl benzimidazole, 0.15 mol of N-(2-phenyl-2-ol-propyl) piperazine and 0.15 mol of sodium carbonate in 600 ml. of acetone are heated under reflux for 7 hours. After completion of the reaction, the precipitate is filtered whilst still warm, evaporated to dryness and redissolved in 150 ml. of ethyl acetate. The solution so obtained is extracted with dilute hydrochloric acid. The aqueous phase is rendered alkaline by the addition of ammonia and is extracted with ethyl acetate. On drying and evaporating a syrupy residue is obtained. This residue is dissolved in 200 ml. of ethanol, treated with 100 ml. of 4.8 N hydrochloric acid and evaporated to dryness. The residue is dissolved in 100 ml. of isopropanol and 15 ml. of ethyl acetate and the mixture is then cooled, rapidly filtered (hygroscopic product) and dried under vacuum. The base is reliberated by the addition of ammonia and is extracted with 100 ml. of benzene under vacuum. The product thus obtained is dried under vacuum and is present in the form of an amorphous powder.

In order to obtain the dimaleate, the base prepared as above is subjected to the following process: a solution of 0.09 mol maleic acid in 50 ml. of acetone is added to 17.32 g. (0.045 mol+10% excess) of the base in 50 ml. of acetone. The dimaleate crystallizes at the completion of the addition. The product is separated by filtration, washed with a little acetone, dried under vacuum for 3 hours and is then recrystallized in 175 ml. of absolute ethanol. Yield after recrystallization=70%; melting point=175–177° C.

*Analysis.*—Calculated (percent): C, 59.78; H, 5.88; N, 9.62. Found (percent): C, 59.59; H, 5.86; N, 9.84.

EXAMPLE 4

N-benzhydryl-N'-(benzimidazolyl-2-methyl) piperazine monomaleate 0.2 mol of N-benzhydryl piperazine, 0.2 mol of 2-chloromethyl benzimidazole and 0.2 mol of sodium carbonate in 500 ml. of acetone are heated under reflux for 7 hours. After completion of the reaction the mineral salts so formed are filtered whilst still warm and the solution is evaporated to dryness to give 62 g. of the crude product.

To prepare the maleate of the above base, 0.15 mol of N-pyrrolidinocarbonylmethyl piperazine and 0.15 mol of sodium carbonate in 375 ml. of acetone, are heated under reflux for 7 hours. After the reaction has finished, the precipitate so formed is filtered whilst still warm and is refluxed with 500 ml. of ethyl acetate and is extracted thereafter with 300 ml. of chloroform at ambient temperature with agitation. The precipitate is separated by filtration and dissolved in water and extracted with chloroform. The chloroform extract is washed once with water, dried on sodium sulphate, evaporated almost to dryness and a little ether is added to cause crystallization. After filtration, the precipitate is dissolved in 90 ml. of warm alcohol and reprecipitated by the addition of 350 ml. of ethyl acetate. The mother liquor is concentrated to obtain two more batches.

By the addition of a solution of 0.068 mol of maleic acid in 40 ml. of ethanol to 0.034 mol of the base isolated above in 100 ml. of ethanol, the dimaleate is obtained which is filtered, washed in ethanol and recrystallized in 120 ml. of 95° ethanol. Yield=47%; melting point=200–202° C.

*Analysis.*—Calculated (percent): C, 55.80; H, 5.94; N, 12.52. Found (percent): C, 55.85; H, 5.98; N, 12.29.

A study of the novel benzimidazolylmethyl-piperazines of the present invention on laboratory animals have shown interesting pharmacological properties.

The compounds of the invention have shown in particular, to exercise hypotensive, cardiotropic, analgesic, sedative and spasmolytic activities.

Hypotensive activity

The administration of the benzimidazolylmethyl-piperazines according to the present invention to an anaesthetised rat have shown a reduction of the arterial pressure.

By way of example, the results obtained with certain of the compounds of the general Formula I are shown in the following table.

TABLE I

| R | Salt | Dose administered, mg./kg. | Method of administration | Arterial pressure | |
|---|---|---|---|---|---|
| | | | | Reduction registered, percent | Time required to reestablish normal pressure, mn. |
| —CH$_2$—CO—OC$_2$H$_5$ | Dimaleate | 1<br>2 | I.V.<br>I.V. | 50<br>50 | 5<br>10 |
| —CH$_2$—CH=CH—⟨phenyl⟩ | Dimaleate | 1<br>2 | I.V.<br>I.V. | 50<br>50 | 5<br>10 |
| —CH$_2$—C(OH)(CH$_3$)(phenyl) | Dimaleate | 2 | I.V. | 50 | >15 |
| —CH$_2$—CO—N⟨pyrrolidine⟩ | Monomaleate | 2<br>5 | I.V.<br>I.V. | 50<br>50 | 5 | the base is dissolved in a warm mixture of 700 ml. of acetone and 60 ml. of alcohol, and after cooling, the solution obtained is treated with a solution of 0.15 mol of maleic acid in 100 ml. of acetone. The maleate crystallizes and is separated by filtration, dried and recrystallized in 250 ml. of absolute alcohol, 44 g. of the product is obtained. Yield (from the crude base)=60%; melting point=154–158° C.

*Analysis.*—Calculated (percent): C, 69.86; H, 6.07; N, 11.24. Found (percent): C, 69.95; H, 6.36; N, 11.36.

EXAMPLE 5

N-(pyrrolidinocarbonylmethyl)-N'-(benzimidazolyl-2-methyl)piperazine dimaleate 0.15 mol of 2-chloromethylbenzimidazole, 0.15 mol of

Cardiotropic activity

There has been shown a regularisation of the intensity of the contractions of the isolated heart of a guinea pig with the novel benzimidazolylmethyl-piperazines of the invention.

By way of example, this action has been manifested with a dose of 200 μg. of N-(pyrrolidinocarbonylmethyl)-N'-(benzimidazolyl-2-methyl) piperazine.

Analgesic activity

The analgesic activity of the novel benzimidazolylmethyl-piperazines has been shown by studying the protection conferred by opposing the action exerted by the intraperitoneal injection of acetic acid on mice, such action being evidenced by painful stretching.

The results obtained with two of the compounds of the general Formula I are shown in the following table:

TABLE II

| R | Salt | Dose administered, mg./kg. | Method of administration | Amount of protection, percent |
|---|---|---|---|---|
| —CH₂—CH=CH—⌬ | Dimaleate | 100 | P.O. | 50 |
| —CH(⌬)(⌬) | Monomaleate | 100 | P.O. | 65 |

Sedative activity

The activity exerted by the novel benzimidazolylmethyl piperazines of the present invention has been shown by studying the behaviour of treated mice in the evasion test.

By way of example, the number of sorties effected by the mice is reduced by 50% when administered 100 mg./kg./p.o. of N-cinnamyl - N' - (benzimidazolyl-2-methyl) piperazine dimaleate.

Spasmolytic activity

The spasmolytic activity of the benzimidazolylmethyl piperazines of the invention compares satisfactorily and equally with that of papaverine. This fact has been shown by studying the antagonism exerted particularly by N-cinnamyl-N'-(benzimidazolyl-2-methyl) piperazine dimaleate and N-(benzhydryl)-N'-(benzimidazolyl-2-methyl) piperazine monomaleate, against the contraction of the duodenum of a rat provoked by barium chloride.

The toxicity of the benzimidazolylmethyl piperazines has also been determined. Considering the results shown in the following Table III and the results given above, the difference between the lethal dose and the pharmacologically active dose is sufficiently large to permit the utilisation of the novel compounds of the invention in human therapeutics.

TABLE III

| R | Salt | DL 50 mg./kg./IV (mouse) |
|---|---|---|
| —CH₂—CO—OC₂H₅ | Dimaleate | 230 |
| —CH₂—C(OH)(CH₃)(⌬) | Dimaleate | 70 |
| —CH(⌬)(⌬) | Monomaleate | 1,350 |
| CH₂—CO—N⌬ | Dimaleate | 250 |

The novel benzimidazolylmethyl piperazines have been utilized to treat traumatic and rheumatic ailments, dental pains, neuralgia and visceral ailments as also irritability and neurovegetative dysuria with or without arterial hypertension.

By way of example the compounds of the invention may be administered in the form of tablets comprising doses of from 10 to 100 mg. of active ingredient and ampoules containing 1 to 50 mg. of active ingredient.

What is claimed is:

1. A compound of the formula:

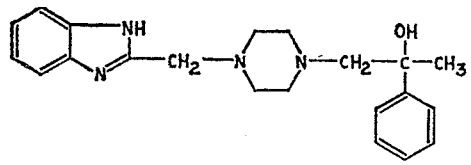

and the pharmaceutically acceptable acid addition salts thereof.

References Cited

UNITED STATES PATENTS 3,362,956  1/1968  Archer _____ 260—268 H
3,472,856  10/1969  Archer _____ 260—309

JOHN D. RANDOLPH, Primary Examiner

U.S. Cl. X.R.

260—240 K; 424—250